United States Patent
Lin et al.

(10) Patent No.: US 9,413,223 B2
(45) Date of Patent: Aug. 9, 2016

(54) BOOST APPARATUS WITH OVER-CURRENT AND OVER-VOLTAGE PROTECTION FUNCTIONS

(71) Applicant: Beyond Innovation Technology Co., Ltd., Taipei (TW)

(72) Inventors: Chiu-Yuan Lin, Taipei (TW);
Chien-Pang Hung, Taipei (TW);
Kuang-Yu Jung, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 215 days.

(21) Appl. No.: 14/275,807

(22) Filed: May 12, 2014

(65) Prior Publication Data
US 2015/0048812 A1 Feb. 19, 2015

(30) Foreign Application Priority Data
Aug. 14, 2013 (TW) .............................. 102129149 A

(51) Int. Cl.
*H02M 1/32* (2007.01)
*H02M 3/156* (2006.01)

(52) U.S. Cl.
CPC ................ *H02M 1/32* (2013.01); *H02M 3/156* (2013.01)

(58) Field of Classification Search
CPC ................................ H02M 1/32; H02M 3/156
USPC .............................. 323/282, 284, 285; 361/18
See application file for complete search history.

(56) References Cited

U.S. PATENT DOCUMENTS

| 6,222,746 B1* | 4/2001 | Kim | H02M 1/4225 323/222 |
| 6,229,293 B1* | 5/2001 | Farrenkopf | H02M 3/156 323/222 |
| 8,242,755 B2* | 8/2012 | Park | H02M 1/36 323/222 |
| 8,686,700 B2* | 4/2014 | Lin | H02H 7/1213 323/271 |

(Continued)

FOREIGN PATENT DOCUMENTS

| CN | 100479312 | 4/2009 |
| TW | I350637 | 10/2011 |
| TW | M455317 | 6/2013 |

OTHER PUBLICATIONS

"Office Action of Taiwan Counterpart Application," issued on Jan. 30, 2015, p. 1-p. 8, in which the listed references were cited.

*Primary Examiner* — Gary L Laxton
*Assistant Examiner* — Kyle J Moody
(74) *Attorney, Agent, or Firm* — Jianq Chyun IP Office

(57) ABSTRACT

A boost apparatus adapted for providing a direct-current (DC) output voltage to a load is provided, and the boost apparatus includes a boost power conversion circuit and a control chip. The boost power conversion circuit has a diode coupled to the load. Besides, the boost power conversion circuit is configured to receive a DC input voltage and provide the DC output voltage to the load in response to a pulse-width-modulation (PWM) signal. The control chip is coupled to the boost power conversion circuit and configured to generate the PWM signal to control the operation of the boost power conversion circuit. The control chip is also configured to stop outputting the PWM signal and enter into a shutdown state when the diode is an open circuit or a short circuit, so as to protect the boost apparatus and/or the load from being damaged.

10 Claims, 1 Drawing Sheet

(56) References Cited

U.S. PATENT DOCUMENTS

| | | | |
|---|---|---|---|
| 2008/0164828 A1* | 7/2008 | Szczeszynski | G05F 1/46 315/300 |
| 2010/0110593 A1* | 5/2010 | Kim | H02M 1/32 361/18 |
| 2010/0123978 A1* | 5/2010 | Lin | H02H 7/1213 361/18 |
| 2013/0009556 A1* | 1/2013 | Szczeszynski | H03K 7/08 315/185 R |
| 2013/0135774 A1* | 5/2013 | Li | H05B 33/0887 361/18 |
| 2013/0147277 A1 | 6/2013 | Popescu-Stanesti et al. | |
| 2013/0320856 A1* | 12/2013 | Lin | H05B 33/089 315/119 |
| 2014/0139111 A1* | 5/2014 | Lin | H05B 33/0887 315/122 |
| 2014/0319908 A1* | 10/2014 | Bogdanik | H02J 1/10 307/9.1 |
| 2015/0207307 A1* | 7/2015 | Lin | H02H 7/1213 361/18 |
| 2015/0237701 A1* | 8/2015 | Lin | H05B 33/0887 315/122 |

\* cited by examiner

BOOST APPARATUS WITH OVER-CURRENT AND OVER-VOLTAGE PROTECTION FUNCTIONS

CROSS-REFERENCE TO RELATED APPLICATION

This application claims the priority benefit of Taiwan application serial no. 102129149, filed on Aug. 14, 2013. The entirety of the above-mentioned patent application is hereby incorporated by reference herein and made a part of this specification.

BACKGROUND OF THE INVENTION

1. Field of the Invention

The invention relates to power conversion and supply technologies; more particularly, the invention relates to a boost apparatus capable of performing over-current and over-voltage protection functions.

2. Description of Related Art

Nowadays, a pulse-width-modulation based (PWM based) boost apparatus may be configured to provide a direct-current (DC) output voltage to a load. However, when the diode located on an output side (or at an output terminal) of the boost apparatus is an open circuit or a short circuit, the power switch located on the power conversion path of the boost apparatus may be damaged (e.g., encountering the issue of short circuit), such that components in the boost apparatus and/or the load may be impaired, or the power source of a system having the boost apparatus applied encounters the issue of short circuit and is thus impaired.

SUMMARY

Accordingly, an embodiment of the invention provides a boost apparatus capable of detecting whether a diode on an output side (or at an output terminal) of the boost apparatus is an open circuit or a short circuit, so as to effectively solve the problem described in the related art.

Other purposes and advantages of the invention may be deduced from the descriptions of the technical features provided herein.

One of the exemplary embodiments provides a boost apparatus adapted for providing a DC output voltage to a load, and the boost apparatus includes a boost power conversion circuit and a control chip, wherein the boost power conversion circuit includes a diode coupled to the load (located on an output side/at an output terminal of the boost apparatus), and the boost power conversion circuit is configured to receive a DC input voltage and provide the DC output voltage to the load in response to a pulse-width-modulation (PWM) signal. The control chip is coupled to the boost power conversion circuit and configured to: generate the PWM signal to control the operation of the boost power conversion circuit; and stop outputting the PWM signal and enter into a shutdown state when the diode is an open circuit or a short circuit, so as to protect the boost apparatus and/or the load from being damaged.

In an exemplary embodiment of the invention, the boost power conversion circuit may further include: an inductor, a capacitor, an N-type power switch, and a first resistor, wherein the inductor has a first terminal for receiving the DC input voltage and a second terminal coupled to an anode of the diode. A cathode of the diode is coupled to the load and provides the DC output voltage to the load. The capacitor has a first terminal coupled to the cathode of the diode and a second terminal coupled to a ground potential. The N-type power switch has a drain coupled to the anode of the diode and a gate for receiving the PWM signal. The first resistor has a first terminal coupled to a source of the N-type power switch and a second terminal coupled to the ground potential.

In an exemplary embodiment of the invention, the control chip may include an inbuilt preset over-current protection (OCP) reference voltage and an OCP detection pin coupled to the first terminal of the first resistor. In this case, the voltage drop across the first resistor is higher than the preset OCP reference voltage when the current flowing through the first resistor is an overcurrent, so that the control chip stops outputting the PWM signal. Moreover, the voltage drop across the first resistor is also higher than the preset OCP reference voltage when the diode is the short circuit, so that the control chip stops outputting the PWM signal and enters into the shutdown state.

In an exemplary embodiment of the invention, the boost power conversion circuit further includes a second resistor and a third resistor, and a first terminal of the second resistor is coupled to the cathode of the diode. A first terminal of the third resistor is coupled to a second terminal of the second resistor, and a second terminal of the third resistor is coupled to the ground potential. In addition, the control chip may further include an inbuilt preset over-voltage protection (OVP) reference voltage and an OVP detection pin coupled to the first terminal of the third resistor. In this case, the voltage drop across the third resistor is higher than the preset OVP reference voltage when the DC output voltage is an overvoltage, so that the control chip stops outputting the PWM signal. Moreover, if the boost apparatus is in a normal operation, and if the diode is the open circuit, the voltage drop across the third resistor is lower than a preset voltage, and the control chip continues outputting the PWM signal with a maximum duty cycle in response to the diode being the open circuit. The control chip stops outputting the PWM signal and enters into the shutdown state if the voltage drop across the third resistor is lower than the preset voltage and if the PWM signal with the maximum duty cycle continues being output.

Based on the above, the boost apparatus provided in an embodiment of the invention may enable/activate the protection mechanism of the control chip to stop outputting the PWM signal which is used for controlling the operation of the boost power conversion circuit and enable the boost power conversion circuit to enter into the shutdown state when the diode located on the output side/at the output terminal of the boost apparatus is the open circuit or the short circuit. Thus, the N-type power switch located on the power conversion path may be prevented from being damaged, e.g., short circuit, and the components in the boost apparatus and/or the load may be prevented from being damaged, or the system to which the boost apparatus is applied may be prevented from power supply short circuit and being damaged.

In order to make the above features and advantages of the invention more apparent, the embodiments are particularly cited with the accompanying drawings and described in detail below.

However, it should be understood that both the foregoing general description and the following embodiments are only exemplary and explanatory and do not limit the scope of the invention of the desired proposition.

BRIEF DESCRIPTION OF THE DRAWINGS

The accompanying drawings below are part of the invention of the specification and illustrate the disclosed exemplary embodiments. The invention will become more apparent from the following detailed description when taken in conjunction with the accompanying drawings.

DETAILED DESCRIPTION OF DISCLOSED EMBODIMENTS

Figure 1:
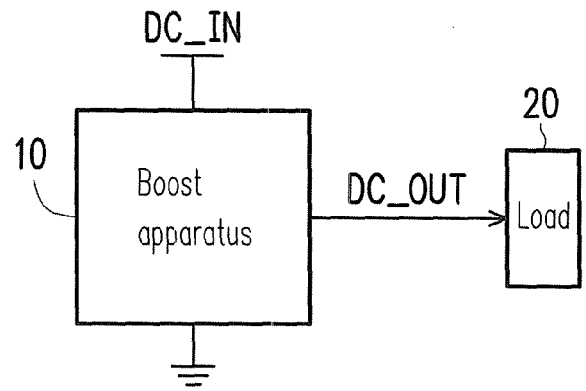
FIG. 1 is a block diagram illustrating a boost apparatus 10 according to an exemplary embodiment of the invention.

Reference will now be made in detail to the embodiments of the invention. The embodiments are illustrated with the accompanying drawings. Wherever possible, the same reference numbers are used in the drawings and the description to refer to the same or like parts.

Figure 2:
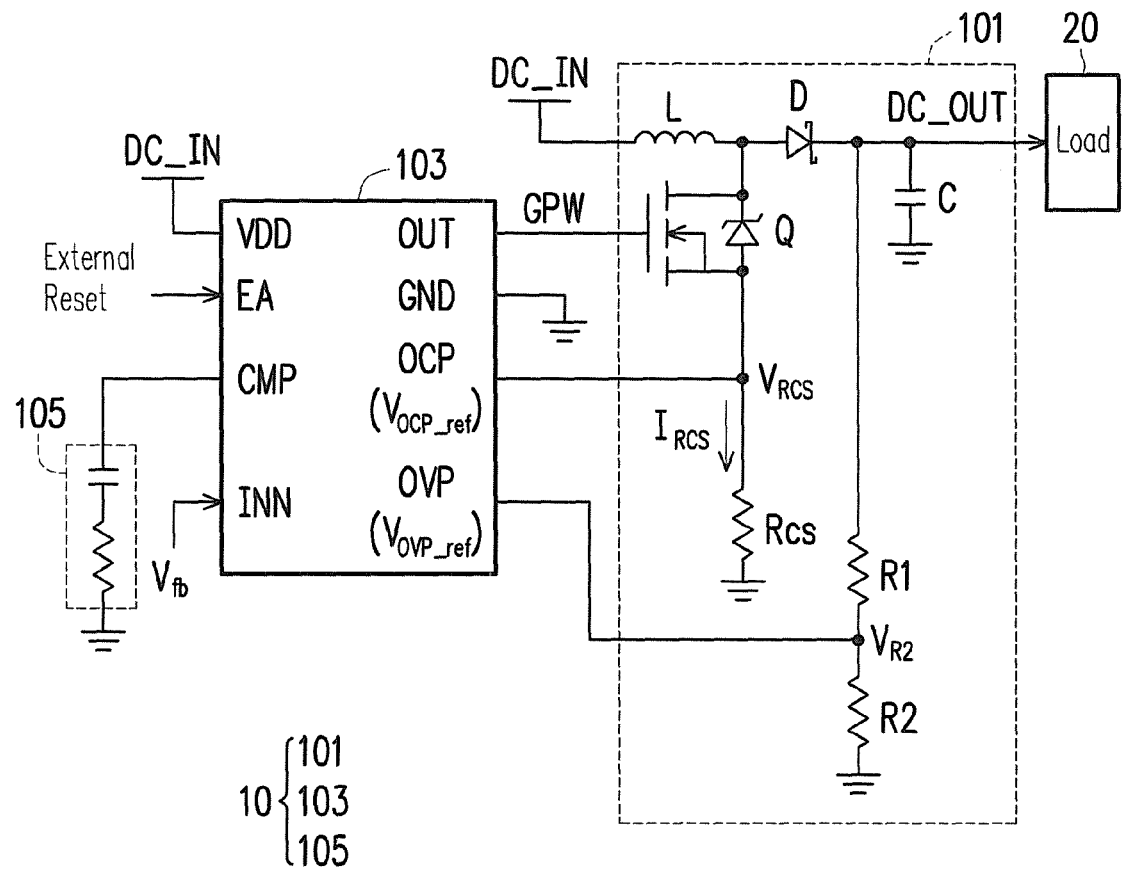
FIG. 2 is a schematic diagram illustrating the boost apparatus 10 depicted in FIG. 1.

FIG. 1 is a block diagram illustrating a boost apparatus 10 according to an exemplary embodiment of the invention. FIG. 2 is a schematic diagram illustrating the boost apparatus 10 depicted in FIG. 1. With reference to FIG. 1 and FIG. 2, the boost apparatus 10 is adapted for providing a DC output voltage DC_OUT to a load 20 of any type. The boost apparatus 10 includes a boost power conversion circuit 101, a control chip 103, and a resistor-capacitor (RC) network 105.

In the exemplary embodiment, the boost power conversion circuit 101 may be configured to receive a DC input voltage DC_IN and provide the DC output voltage DC_OUT to the load 20 in response to a pulse-width-modulation (PWM) signal GPW that comes from the control chip 103.

For example, the boost power conversion circuit 101 may include a diode D coupled to the load 20, an inductor L, a capacitor C, an N-type power switch Q, and resistors (Rcs, R1, and R2). Here, the diode D includes but is not limited to a Schottky diode located on the output side/at an output terminal of the boost apparatus 10. Besides, the N-type power switch Q may be implemented in form of an N-type power metal oxide semiconductor field effect transistor (MOSFET), which should however not be construed as a limitation to the invention.

The first terminal of the inductor L is used for receiving (or is coupled to) the DC input voltage DC_IN, the second terminal of the inductor L is coupled to the anode of the diode D, and the cathode of the diode D is coupled to the load 20 and provides a DC output voltage DC_OUT to the load 20. The first terminal of the capacitor C is coupled to the cathode of the diode D, and the second terminal of the capacitor C is coupled to the ground potential (0V).

The drain of the N-type power switch Q is coupled to the anode of the diode D, and the gate of the N-type power switch Q receives the PWM signal GPW outputted from the control chip 103. The first terminal of the resistor Rcs is coupled to the source of the N-type power switch Q, and the second terminal of the resistor Rcs is coupled to the ground potential. The resistors (R1 and R2) are serially connected between the cathode of the diode D and the ground potential; that is, the first terminal of the resistor R1 is coupled to the cathode of the diode D, the first terminal of resistor R2 is coupled to the second terminal the resistor R1, and the second terminal of the resistor R2 is coupled to ground potential.

On the other hand, the control chip 103 may have a plurality of pins, for example, a power supply pin VDD, a ground pin GND, a chip enabling pin EA, an output pin OUT, an over-current protection detection pin OCP, an over-voltage protection detection pin OVP, a feedback pin INN, and a compensation pin CMP. Certainly, based on the actual design/application requirements, other functional pins may be added to the control chip 103, or the existing functional pins may be deleted from the control chip 103. Basically, in order to for the control chip 103 to operate normally, the power supply pin VDD receives the DC input voltage DC_IN required by the control chip 103 for operation, and the ground pin GND is coupled to the ground potential. As a result, the DC input voltage DC_IN may be converted (for example, bucked/boosted) by the control chip 103, so as to obtain the operation voltage required by the internal circuit(s) (not shown) of the control chip 103.

In the exemplary embodiment, the control chip 103 is coupled to the boost power conversion circuit 101 and configured to generate the PWM signal GPW and control the operation of the boost power conversion circuit 101 through outputting the PWM GPW from the output pin OUT which is coupled to the gate of the N-type power switch Q. The control chip 103 is also configured to stop outputting the PWM GPW and enter into a shutdown state when the diode is an open circuit or a short circuit, so as to protect the boost apparatus 10 and/or the load 20 from being damaged.

More specifically, the control chip 103 may include an inbuilt preset over-current protection (OCP) reference voltage Vocp_ref and an inbuilt preset over-voltage protection (OVP) reference voltage Vovp_ref, and the OCP detection pin OCP and the OVP detection pin OVP are individually coupled to the first terminal of the resistor Rcs and the first terminal of the resistor R2.

In the exemplary embodiment, when the current $I_{Rcs}$ that flows through the resistor Rcs is an overcurrent, the voltage $V_{Rcs}$ across the resistor Rcs is higher than the inbuilt preset OCP reference voltage Vocp_ref of the control chip 103. In this case, the control chip 103 stops outputting the PWM signal GPW, so as to enable/activate the OCP mechanism. In addition, when the diode D is a short circuit, the voltage $V_{Rcs}$ across the resistor Rcs rises abnormally in response to the current from the capacitor C, and the voltage $V_{Rcs}$ is higher than the inbuilt preset OCP reference voltage Vocp_ref of the control chip 103. In this case, the control chip 103 stops outputting the PWM GPW and enters into the shutdown state, so as to protect the boost apparatus 10 and/or the load 20 from being damaged due to the shorted diode D.

Further, the voltage $V_{R2}$ across the resistor R2 is higher than the preset OVP reference voltage Vovp_ref when the DC output voltage DC_OUT is an overvoltage. In this case, the control chip 103 may stop outputting the PWM signal GPW, so as to enable/activate the OVP mechanism.

In addition, when the boost apparatus 10 is operated normally, and the diode D is an open circuit, the DC output voltage DC_OUT may not be established, and in response thereto, the voltage $V_{R2}$ across the resistor R2 is lower than a preset voltage (e.g.: the preset voltage may include but may not be limited to 60 mV). Moreover, since no DC output voltage DC_OUT is outputted, the control chip 103 continues outputting the PWM signal GPW with the maximum duty cycle (including but not limited to 95%) in response to the diode D being the open circuit.

Accordingly, when the voltage $V_{R2}$ across the resistor R2 is lower than the preset voltage (including but limited to 60 mV), and the PWM signal GPW with the maximum duty cycle (including but not limited to 95%) continues being output. The control chip 103 determines that the diode D is already an open circuit and thereby stops outputting the PWM signal GPW and enters into the shutdown state, so as to protect the boost apparatus 10 and/or the load 20 from being damaged by the opened diode D.

On the other hand, in the exemplary embodiment, the RC network 105 may be coupled to the compensation pin CMP of the control chip 103 (or arranged between the compensation pin CMP of the control chip 103 and the ground potential), so as to stabilize of the boost apparatus 10. Here, the RC network 105 includes but is not limited to serially connected resistor and capacitor. In practice, the RC network 105 may be configured to stabilize the PWM signal GPW outputted from the control chip 103, thereby stabilizing the DC output voltage DC_OUT provided by the boost power conversion circuit 101. Furthermore, the control chip 103 may receive a feedback voltage $V_{fb}$ associated with the DC output voltage DC_OUT or the load 20 through the feedback pin INN, so as to adjust the DC output voltage DC_OUT to a preset value/setting value/fixed value.

In addition, once the control chip 103 enters into the shutdown state in response to the diode D being the open circuit or the short circuit or in response to the over-current or over-voltage condition, the control chip 103 may be reset through the chip enabling pin EA of the control chip 103 from the outside, such that the control chip 103 is converted/recovered from the shutdown state to an activation state.

To sum up, the control circuit 103 of the boost apparatus 10 provided in an embodiment of the invention may enable/activate the protection mechanism when the diode D on the output side/at the output terminal is the open circuit or the short circuit, through stopping outputting the PWM signal GPW for controlling the boost power conversion circuit 101 and entering into the shutdown state. Thus, the N-type power switch Q located on the power conversion path may be prevented from being damaged, e.g., short circuit, and the components inside the boost apparatus 10 and/or the load 20 can be prevented from being damaged, or the system where the boost apparatus 10 is applied may be prevented from power supply short circuit or being damaged.

It is worth mentioned that if the load 20 is a light-emitting diode load (LED load), the boost apparatus 10 may be applied to the backlight driving of a liquid crystal display (LCD). Further, if the load 20 is a circuit system load, the boost apparatus 10 may be applied to the constant voltage supplying of a power conversion field. However, the boost apparatus 10 mentioned in the exemplary embodiments can be applied in other fields as well.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A boost apparatus adapted for providing a direct-current output voltage to a load, the boost apparatus comprising:
   a boost power conversion circuit configured to receive a direct-current input voltage and provide the direct-current output voltage to the load in response to a pulse-width-modulation signal, wherein the boost power conversion circuit comprises:
   a diode coupled to the load;
   an inductor having a first terminal for receiving the direct-current input voltage and a second terminal coupled to an anode of the diode, wherein a cathode of the diode is coupled to the load and provides the direct-current output voltage to the load;
   a capacitor having a first terminal coupled to the cathode of the diode and a second terminal coupled to a ground potential;
   an N-type power switch having a drain coupled to the anode of the diode and a gate for receiving the pulse-width-modulation signal;
   a first resistor having a first terminal coupled to a source of the N-type power switch and a second terminal coupled to the ground potential;
   a second resistor having a first terminal coupled to the cathode of the diode; and
   a third resistor having a first terminal coupled to a second terminal of the second resistor and a second terminal coupled to the ground potential; and
   a control chip coupled to the boost power conversion circuit, the control chip being configured to: generate the pulse-width-modulation signal to control an operation of the boost power conversion circuit; and stop outputting the pulse-width-modulation signal and enter into a shutdown state when the diode is open-circuited, so as to protect the boost apparatus and/or the load from being damaged,
   wherein if the boost apparatus is in a normal operation, and if the diode is open-circuited, a voltage drop across the third resistor is lower than a preset voltage, and thus the control chip continues outputting the pulse-width-modulation signal with a maximum duty cycle in response to the diode being open-circuited, and
   wherein if the voltage drop across the third resistor is kept lower than the preset voltage, and the pulse-width-modulation signal with the maximum duty cycle continues being output concurrently, then the control chip stops outputting the pulse-width-modulation signal and enters into the shutdown state.

2. The boost apparatus of claim 1, wherein the diode is a Schottky diode.

3. The boost apparatus of claim 1, wherein:
   the control chip includes an inbuilt preset over-current protection reference voltage and an over-current protection detection pin coupled to the first terminal of the first resistor, and
   a voltage drop across the first resistor is higher than the preset over-current protection reference voltage when a current flowing through the first resistor is an overcurrent, such that the control chip stops outputting the pulse-width-modulation signal.

4. The boost apparatus of claim 3, wherein:
   the control chip is further configured to stop outputting the pulse-width-modulation signal and enter into the shutdown state when the diode is short-circuited, and
   the voltage drop across the first resistor is higher than the preset over-current protection reference voltage when the diode is the short circuit, such that the control chip stops outputting the pulse-width-modulation signal and enters into the shutdown state.

5. The boost apparatus of claim 1, wherein:
   the control chip includes a inbuilt preset over-voltage protection reference voltage and an over-voltage protection detection pin coupled to the first terminal of the third resistor, and
   the voltage drop across the third resistor is higher than the preset over-voltage protection reference voltage when the direct-current output voltage is an overvoltage, such that the control chip stops outputting the pulse-width-modulation signal.

6. The boost apparatus of claim 1, wherein the control chip includes an output pin, and the output pin is coupled to the gate of the N-type power switch for outputting the pulse-width-modulation signal.

7. The boost apparatus of claim 1, wherein the control chip includes a compensation pin, and the boost apparatus further comprises:

a resistor-capacitor network coupled to the compensation pin and configured to enable the boost power conversion circuit to stably provide the direct-current output voltage.

8. The boost apparatus of claim 1, wherein the control chip includes a feedback pin to receive a feedback voltage associated with the direct-current output voltage or the load, so as to adjust the direct-current output voltage.

9. The boost apparatus of claim 1, wherein the control chip includes a chip enabling pin configured to reset the control chip from outside and recover the control chip from the shutdown state to an activation state.

10. The boost apparatus of claim 1, wherein the control chip includes a power pin to receive the direct-current input voltage required for operation, and the control chip further includes a ground pin coupled to the ground potential.

* * * * *